United States Patent
Patel

(10) Patent No.: US 7,697,413 B2
(45) Date of Patent: Apr. 13, 2010

(54) METHOD FOR GENERATING A CODE MASK FOR CODING TRANSMISSION OVER A TRAFFIC CHANNEL

(75) Inventor: Sarvar Patel, Montville, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1313 days.

(21) Appl. No.: 10/423,947

(22) Filed: Apr. 28, 2003

(65) Prior Publication Data

US 2004/0213280 A1 Oct. 28, 2004

(51) Int. Cl.
*H04J 11/00* (2006.01)
(52) U.S. Cl. ......................... 370/209; 370/320
(58) Field of Classification Search ............. 370/203, 370/208, 209, 310, 320, 335, 342, 389, 349, 370/505, 506, 471, 441
See application file for complete search history.

(56) References Cited

U.S. PATENT DOCUMENTS

| | | | | |
|---|---|---|---|---|
| 5,309,474 A | * | 5/1994 | Gilhousen et al. | 370/209 |
| 5,673,259 A | * | 9/1997 | Quick, Jr. | 370/342 |
| 5,844,885 A | * | 12/1998 | Grob et al. | 370/216 |
| 5,987,014 A | * | 11/1999 | Magill et al. | 370/335 |
| 6,377,539 B1 | * | 4/2002 | Kang et al. | 370/209 |
| 6,389,138 B1 | * | 5/2002 | Li et al. | 380/35 |
| 6,456,612 B1 | * | 9/2002 | Kim et al. | 370/342 |
| 6,504,832 B1 | * | 1/2003 | Koo et al. | 370/342 |
| 6,519,239 B1 | | 2/2003 | Panchal et al. | |
| 6,671,251 B1 | * | 12/2003 | Kim et al. | 370/209 |
| 2001/0031639 A1 | * | 10/2001 | Makipaa | 455/450 |

OTHER PUBLICATIONS

European Search Report Dated Aug. 30, 2004.

* cited by examiner

*Primary Examiner*—Brenda Pham
(74) *Attorney, Agent, or Firm*—John Ligon

(57) ABSTRACT

In the method a code mask for coding transmission over a traffic channel is generated based on a base station differentiator and a traffic channel differentiator. Base station differentiators are used to differentiate between different base stations and traffic channel differentiators are used by a base station to differentiate between different traffic channels assigned by a base station.

14 Claims, 3 Drawing Sheets

| BS DIFF. | +TRAFFIC CH. DIFF. | +FILLER BITS |
|---|---|---|

| F | PN OFFSET | BS_ID | WALSH CODE |
|---|---|---|---|

| 41 | 40 39 | 32 31 | 0 |
|---|---|---|---|
| TYPE | SIGNALING | ESN | |

FIG. 3

| BS DIFF. +TRAFFIC CH. DIFF. +FILLER BITS |
|---|

FIG. 4

| F | PN OFFSET | BS_ID | WALSH CODE |
|---|---|---|---|

FIG. 5

| F | PN OFFSET | WALSH CODE | BS_ID |
|---|---|---|---|

FIG. 6

| BS_ID | WALSH CODE | PN OFFSET | F |
|---|---|---|---|

FIG. 7

| F | WALSH CODE ⊗ PN OFFSET | BS_ID |

FIG. 8

| F | f(PN OFFSET) | BS_ID | WALSH CODE |

FIG. 9

| WALSH CODE ⊗ PN OFFSET PART 2 | BS_ID | WALSH CODE ⊗ PN OFFSET PART1 | F |

METHOD FOR GENERATING A CODE MASK FOR CODING TRANSMISSION OVER A TRAFFIC CHANNEL

BACKGROUND OF THE INVENTION

FIG. 1 illustrates a portion of a geographic area in which wireless services are provided by a first service provider having a first network of cells 10 and a second service provider having a second network of cell 20. Each of the cells in the first and second networks of cells 10 and 20 represents a coverage area for a corresponding base station BS in the network run by the respective service provider. A base station BS generally provides wireless communication services for mobile stations 12 within its coverage area.

As will be appreciated, the communication between one base stations BS and a mobile station 12 has great potential for interfering with the communication between another base station BS and another mobile station 12. This potential exists for base stations BSs in the same network as well as between base stations BSs in different networks. Also, the communication between the same base station BS and two different mobile stations 12 has the potential for interfering with one another. To avoid this interference, wireless communication systems such as CDMA 2000 wireless systems use codes to code and differentiate transmissions. As will be described below, base stations BSs use codes generated from different offset values to differentiate between transmissions by different base stations. Also, a base station BS uses codes to differentiate between different traffic channels assigned to mobile stations by the base station BS.

In a CDMA 2000 system, each service provider assigns an identifier BS_ID to the base stations BS within its network to uniquely identify each base station BS in the network. However, a base station identifier BS_ID does not necessarily uniquely identify base stations BSs in different networks. When transmitting, a base station codes its transmission based on a different offset such as the PN offset in CDMA 2000. In CDMA 2000, the PN offset is a 9 bit string that differentiates one base station BS from its neighboring base stations BSs even when those base stations BSs are in different networks. As illustrated in FIG. 1, base stations BSs from different networks may be neighboring base stations. While FIG. 1 illustrates neighboring base stations as having coverage areas that are adjacent or near one another (e.g., separated by one or more cells), it will be understood, that neighboring base stations may also have overlapping coverage areas. At a mobile station 12, the mobile station 12 obtains the PN offset from the base station BS to decode the transmissions from the base station BS and differentiate the transmission of one base station BS from another base station BS. In CDMA 2000, for example, the mobile station 12 obtains the PN offset as well as the base station identifier BS_ID from a message broadcast by the base station over a forward control channel.

When a base station BS assigns a traffic channel over which the mobile station 12 may communicate, the base station BS uses codes to differentiate one traffic channel transmission from another traffic channel transmission. In CDMA 2000, a different Walsh code is used to code each traffic channel of a base station BS. As with the PN offset, the Walsh code assigned to a traffic channel between the base station BS and a mobile station 12 is communicated to the mobile station 12 in a message over a forward control channel. At the mobile station 12, the mobile station 12 decodes the transmission over the traffic channel and differentiates one traffic channel from another using the Walsh code.

Codes are also used to differentiate reverse link transmissions (mobile station to base station) over traffic channels. The code used by a mobile station to code and differentiate traffic channel transmissions is referred to as a code mask. In CDMA 2000, the code mask is referred to as the long code mask, and two types of long code masks are known: private and public. In CDMA 2000, the public long code mask (PLCM) is typically formed using the electronic serial number (ESN) of the mobile station 12. FIG. 2 illustrates an example public long code mask formed according to CDMA 2000 that is 42 bits long; however, other long code mask sizes exist. As shown, the long code mask includes 2 bits indicating the type of the long code mask (private or public), 8 bits providing signaling information such as the method used to form the long code mask, and the 32 bit ESN of the mobile station 12. The 32 bit ESN is often considered the variable portion of the PLCM.

For the base station BS to decode the traffic channel transmission for the mobile station 12, the BS must obtain the mobile station's ESN, and numerous methods are known in the art for accomplishing this. As an alternative to the above-discussed PLCM generation method, CDMA 2000 also provides that the base station BS may assign a PLCM of its choosing to a mobile station 12 during a call activation (e.g., call origination or call delivery).

Presently, the supply of 32 bit ESNs is being exhausted, and discussions have begun on transitioning from the use of 32 bit ESNs to 56 bit mobile equipment identifiers (MEIDs). The use of a 56 bit MEID poses several challenges such as in the generation of public long code masks. Directly using the MEID would require hardware changes. Accordingly, several proposals exist for using the MEID to generate the public long code mask that do not require such hardware changes. One proposal is to map the 56 bit MEID to a 24 bit value, concatenate a fixed 8 bit value to the 24 bit mapped value and create a 32 bit pseudo-ESN. The pseudo-ESN could then be used as the ESN in the conventional public long code mask generation process.

However, it has been shown that this pseudo-ESN method does not result in a sufficient number of different public long code masks to prevent an undesirable number of collisions between mobile station communications. A collision is where the transmissions from two or more mobile stations are not uniquely identifiable.

Other techniques attempt to resolve this collision problem by introducing additional complexity into the system. For example, one proposal is to have the base stations assign the public long code mask using a methodology to ensure a unique value within the network. However, during inter-network hand-offs, this uniqueness can not be ensured and collisions may result. In view of this, even further layers of complexity in preventing collisions have been suggested.

SUMMARY OF THE INVENTION

The present invention provides a method for generating a code mask for use in coding transmissions over a traffic channel that provides the desired level of uniqueness to differentiate between mobile station traffic channel communication. According to the present invention, the code mask is generated based on a base station differentiator and a traffic channel differentiator.

In one exemplary embodiment, the code mask is generated by including the PN offset as a base station differentiator and the Walsh code as a traffic channel differentiator in the code mask. Accordingly, it will be understood that the terminology "differentiator" covers a differentiating value such as an offset used to generator a code using in coding a transmission as well as the code itself. For example, the PN offset is different among base stations, even neighboring base stations from other networks. The Walsh code is different among the traffic channels assigned by a base station. Together, the PN offset and Walsh code provide a differentiating portion of the code mask. Accordingly, collisions may be prevented.

Furthermore, the mobile station acquires the PN offset and Walsh code as part of its normal operation not necessarily tied to the generation of the code mask. As such, by setting this method of code mask generation as the fixed or default method of code mask generation, no additional complexity or signaling may be needed to generate the code mask. For instance, no communication of the code mask from the base station to the mobile station is required. However, the code mask generated according to the present invention may also be assigned by a base station during call activation (e.g., call origination or delivery), or directly or indirectly assigned during hand-off.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein:

FIG. 3 illustrates an exemplary embodiment of the code mask according to the present invention; and FIG. 4-9 illustrates several arrangements of the code mask according to the present invention.

DETAILED DESCRIPTION OF EMBODIMENTS

Figures 1, 2:
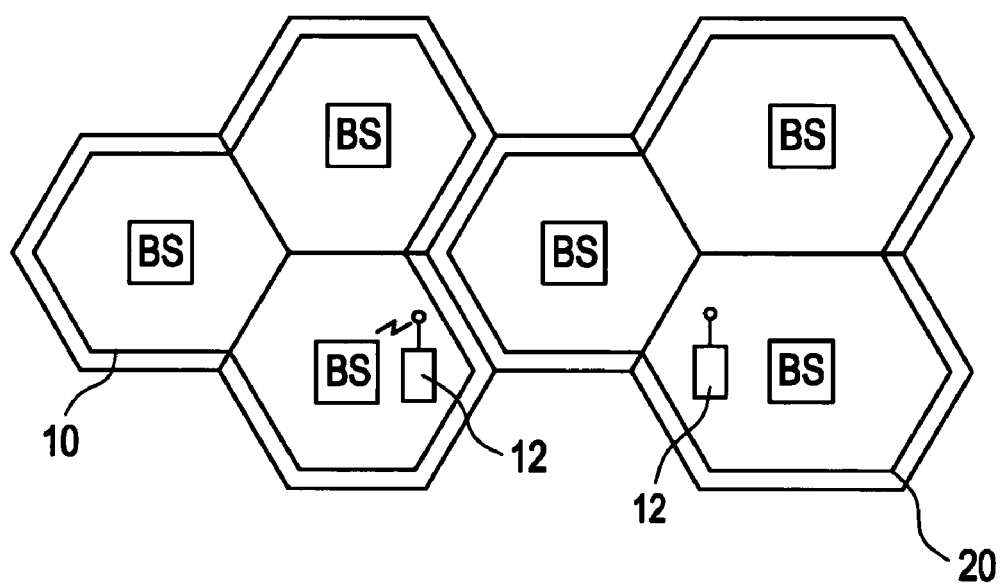
FIG. 1 illustrates a portion of a geographic area in which wireless services are provided by a first service provider having a first network of cells and a second service provider having a second network of cells.
FIG. 2 illustrates an example long code mask formed according to CDMA 2000.

The present invention provides a method for generating a code mask such a the public long code mask in CDMA 2000 for use in coding transmissions over a traffic channel. According to the present invention, the code mask is generated based on a base station differentiator and a traffic channel differentiator. As discussed above, a base station differentiator is different among neighboring base stations, even neighboring base stations from other networks. As further discussed above, a traffic channel differentiator is different among the traffic channels assigned by a base station. As further discussed above, it will be understood that the terminology "differentiator" covers a differentiating value such as an offset used to generator a code using in coding a transmission as well as the code itself. Together, the base station differentiator and the traffic channel differentiator provide a basis for identifying a transmission; and thus, avoiding collisions between mobile station transmissions—even during inter-system hand-offs.

FIG. 3 illustrates an exemplary embodiment of the code mask according to the present invention. As shown, the code mask includes a base station differentiator, a traffic channel differentiator, and a number of filler bits. The filler bits bring the total number of bit forming the code mask up to that required by a particular standard such as CDMA 2000. Accordingly, the filler bits may include bits prescribed by the standard. For example, in CDMA 2000, the filler bits include the type and signaling portions shown in FIG. 2. The ESN portion of FIG. 2 is then formed from a base station differentiator, a traffic channel differentiator and additional filler bits to bring the total number of bits to 42. It should be understood, however, that more than the ESN portion of the PLCM illustrated in FIG. 2 may be considered or treated as the variable portion of the PLCM, and generated according to the principles of the present invention.

FIGS. 4-9 illustrates several arrangements of the code mask according to the present invention. More specifically, FIGS. 4-9 illustrate the possible arrangements of the variable portion (assumed to be the ESN portion) of a public long code mask having the format prescribed by CDMA 2000 as shown in FIG. 2. As shown by these figures, the variable portion of the code mask may be generated by concatenating a base station differentiator, a traffic channel differentiator and the filler bits not prescribed by the standard in any particular order. Furthermore, the code mask according to the present invention also permits multiplexing and arranging the multiplexed bits. Accordingly, it will be appreciated from this and the forgoing disclosure that numerous embodiments for the code mask based on the base station differentiator and the traffic channel differentiator exist and are contemplated as the subject matter of this invention. As a further example, one or more of the base station differentiator, the traffic channel differentiator and the filler bits may be encoded (e.g., using a block cipher such as DES) or permutated (e.g., using a pair-wise independent permutation).

FIGS. 4-9 illustrate the base station differentiator as the PN offset in CDMA 2000 and the traffic channel differentiator as the Walsh code in CDMA 2000. As shown in FIG. 4, the variable portion (assumed to be the ESN portion in FIGS. 4-9) of the public long code mask for CDMA 2000 is formed by concatenating a fixed bit F ('0' or '1'), the PN offset, the base station identifier BS_ID and the Walsh code. Here the base station identifier BS_ID and the fixed bit serve as filler bits; however, the present invention is not limited to forming the filler bits in this manner.

In the embodiment of FIG. 5, the ESN portion of the code mask is formed by concatenating the fixed bit F, the PN offset, the Walsh code and the base station identifier BS_ID. In the embodiment of FIG. 6, the ESN portion of the code mask is formed by concatenating the base station identifier, the Walsh code, the PN offset and the fixed bit F.

FIG. 7 illustrates that the PN offset and the Walsh code are multiplexed in some predetermined manner. The ESN of the code mask is then formed by concatenating the fixed bit F, the multiplexed bits and the base station identifier BS_ID. As demonstrated by the above described embodiment, the present invention is not limited to this order of concatenation.

FIG. 8 illustrates that one or more of the base station differentiator, the traffic channel differentiator and the filler bits may be encoded (e.g., using a block cipher such as DES) or permutated (e.g., using a pair-wise independent permutation). As shown, the PN offset has been encoded or permutated—as denoted by the function f(PN offset), and the ESN portion of the public long code mask has been generated by concatenating the fixed bit, the encoded or permutated PN offset, the base station identifier BS_ID, and the Walsh code.

FIG. 9 illustrates that the present invention is not limited to having the bits, multiplexed bits, encoded bits, or permutated bits appear as a continuous string of bits. Instead, as shown in FIG. 9, one or more strings of bits may be arranged in the mask code in a discontinuous manner. FIG. 9 illustrates the ESN portion of the mask code is formed by concatenating a second part (e.g., second half) of the multiplexed bits in FIG.

7, the base station identifier BS_ID, a first part (e.g., first half) of the multiplexed bits in FIG. 7 and the fixed bit F.

As discussed above, it is well known that the Walsh code, base station identifier BS_ID and PN offset are provided to the mobile station, generally over a forward control channel. Accordingly, in one exemplary embodiment of the present invention, the method of generating the code mask in a wireless network is fixed according to the format for the code mask as set forth in one of the above-described embodiments. Because both the mobile station and the base station know the format and both the mobile station and the base station have the information needed to form the code mask, no assignment of the code mask by the base station is necessary. Nor is it necessary for the base station to inform the mobile station of the method for generating the code mask. As a result, the complexity and overhead for generating the code mask at both the mobile station and the base station is greatly reduced.

Even when the wireless network provides for the possibility of generating the code mask according to more than one method, the method of the present invention may be established as the default method for generating the code mask when the base station fails to indicate the method of generation and/or fails to provide the code mask. Thus, the same beneficial results as with fixing the method of generating the code mask can be achieved.

Also, when the wireless network provides for the possibility of generating the code mask according to more than one method, the base station may send a message such as over a forward control channel to the mobile station indicating to form the code mask according to one of the embodiments of the present invention.

Alternatively, the base station may provide the code mask formed according to one of the embodiments of the present invention over, for example, the forward control channel to the mobile station. Also, the base station may provide the code mask formed according to one of the embodiments of the present invention to the mobile station during call activation (e.g., call origination or delivery) or during a hand-off. During a hand-off, the code mask may be supplied directly or indirectly. In a hand-off, the mobile station is handed off from a source base station to a target base station. Accordingly, a traffic channel between the target base station and the mobile station is created. Here, the target base station can communicate the code mask directly to the mobile station, or indirectly by sending the code mask to the mobile station via the source base station.

The invention being thus described, it will be obvious that the same may be varied in many ways. Such variations are not to be regarded as a departure from the spirit and scope of the invention, and all such modifications as would be obvious to one skilled in the art are intended to be included within the scope of the present invention.

I claim:

1. A method for coding reverse-link transmissions in a wireless communication system to differentiate among the transmissions, comprising:
   generating, by a network element, a code mask for coding the reverse-link transmissions, the code mask including a first number of bits forming a fixed portion thereof and a second number of bits forming a variable portion thereof;
   wherein the variable portion of the code mask comprises a base station differentiator, a traffic channel differentiator, and a number of filler bits as required to cause the number of bits in the variable portion to satisfy a given transmission standard.

2. The method of claim 1, wherein the base station differentiator includes a PN offset for a base station assigning the reverse-link transmission channel and a base station identifier for the assigning base station.

3. The method of claim 1, wherein the generating step generates the code mask by concatenating the base station differentiator and the traffic channel differentiator and the number of filler bits in any predetermined order.

4. The method of claim 3, wherein the number of filler bits further includes a fixed bit string.

5. The method of claim 1, wherein the generating step multiplexes bits of the base station differentiator and the traffic channel differentiator together and includes the multiplexed bits in the code mask.

6. The method of claim 1, wherein the generating step encodes and permutates bits of one of the base station differentiator and the traffic channel differentiator, and includes the encoded or permutated bits in the code mask.

7. The method of claim 1, further comprising:
   sending, from the base station assigning the traffic channel, a message indicating the code mask.

8. The method of claim 1, wherein the generating step generates the code mask as a default method of generating the code mask.

9. The method of claim 1, further comprising:
   sending the code mask to a mobile station.

10. The method of claim 9, wherein the sending step sends the code mask during one of call activation and hand-off.

11. The method of claim 1, further comprising:
    receiving, at a base station, over the traffic channel using the code mask.

12. A method for coding transmission to differentiate transmission over traffic channels from a mobile station, comprising:
    receiving, by a network element, a PN offset, a Walsh code, and a number of filler bits, the number of filler bits including a base station identifier for the base station assigning the traffic channel;
    generating a code mask for coding transmissions over a traffic channel based on the received PN offset, the received Walsh code, and the base station identifier; and
    coding the code mask onto the transmission over the traffic channel.

13. A method for coding transmission to differentiate transmission over traffic channels at a mobile station, comprising:
    receiving, by a network element, a code mask during one of call activation and hand-off, the code mask for coding transmissions over a traffic channel and including a base station differentiator, a Walsh code of the traffic channel, and a number of filler bits, the number of filler bits including a base station identifier for the base station assigning the traffic channel; and
    coding the code mask onto the transmissions over the traffic channel.

14. A method for coding transmission to differentiate transmission over traffic channels from a mobile station, comprising:
    generating, by a network element, a code mask for coding transmissions over a traffic channel based on a base station differentiator, a traffic channel differentiator, and a number of filler bits, the number of filler bits including a base station identifier for the base station assigning the traffic channel;
    coding the code mask onto the transmissions over the traffic channel; and
    transmitting over the traffic channel using the generated code mask.

* * * * *